United States Patent [19]
Wu et al.

[11] Patent Number: 5,979,868
[45] Date of Patent: Nov. 9, 1999

[54] HIGH PRESSURE HOSE COUPLING

[76] Inventors: Jean-Ton Wu, No. 45-2, An-Hsi Li, Jia-Li Jenn, Tainan Hsien; Yau-Jean Hung, No. 66-21, Kuo-Fu Li, Hua-Lien City, both of Taiwan

[21] Appl. No.: 09/079,077

[22] Filed: May 14, 1998

[51] Int. Cl.⁶ .................................................. F16L 37/28
[52] U.S. Cl. ..................................... 251/149.6; 251/149.1
[58] Field of Search ............................ 251/149.6, 149.8, 251/149.9, 149.1

[56] References Cited

U.S. PATENT DOCUMENTS

| | | | |
|---|---|---|---|
| 2,750,209 | 6/1956 | Robb | 251/149.6 |
| 3,729,023 | 4/1973 | Hammond | 251/149.6 |
| 4,449,545 | 5/1984 | Vernor et al. | 251/149.9 |
| 4,974,623 | 12/1990 | Sturgis | 251/149.6 |

FOREIGN PATENT DOCUMENTS 59513  6/1942  Netherlands .

*Primary Examiner*—A. Michael Chambers
*Attorney, Agent, or Firm*—Charles E. Baxley, Esq.

[57] ABSTRACT

A hose coupling includes an element having one end coupled to a pressurized liquid source and the other end having a valve seat, and a barrel secured to the other end of the element. A stop member is secured between the barrel and the element. A valve member is slidably engaged in the element and has a valve stem slidably engaged in an aperture. The valve stem has a head for engaging with the valve member and biased to engage with the valve member. An insert is slidably engaged in the barrel and has a pusher for disengaging the head from the valve member. A spring may bias the insert away from the stop member, and a connector may engage into the barrel for forcing the insert to disengage the head from the valve member and for allowing the pressurized liquid to flow through the hose coupling.

3 Claims, 7 Drawing Sheets

HIGH PRESSURE HOSE COUPLING

BACKGROUND OF THE INVENTION

1. Field of the Invention

The present invention relates to a hose coupling, and more particularly to a hose coupling for coupling the pipes or hoses having high pressure therein.

2. Description of the Prior Art

Typical hose couplings comprise a first coupler coupled to a high pressure source and a second coupler secured to a facility that is required the high pressure air or liquid. However, when the second coupler is engaged into the first coupler, the pressurized air or liquid may flow out with a great pressure such that the user may not easily couple the second coupler with the first coupler.

The present invention has arisen to mitigate and/or obviate the afore-described disadvantages of the conventional hose couplings.

SUMMARY OF THE INVENTION

The primary objective of the present invention is to provide hose coupling for allowing the couplers to be easily and smoothly coupled together.

In accordance with one aspect of the invention, there is provided a hose coupling comprising a body including a first end for coupling to a pressurized liquid source and including a second end having a valve seat, a barrel secured to the second end of the body, a stop member secured between the barrel and the body, a valve member slidably engaged in the body and located between the valve seat of the body and the stop member, the valve member including an aperture and a valve stem slidably engaged in the aperture, the valve stem including a head for engaging with the valve member and means for biasing the head to engage with the valve member and for blocking the aperture, an insert slidably engaged in the barrel and including an orifice for receiving the pressurized liquid, the insert including a pusher for engaging with the valve stem and for disengaging the head from the valve member and for allowing the pressurized liquid to flow through the aperture of the valve member, means for biasing the insert away from the stop member, and a connector for engaging into the barrel and for forcing the insert against the insert biasing means and for actuating the pusher to disengage the head from the valve member and for allowing the pressurized liquid to flow through the aperture of the valve member. The head biasing means may force the head toward the valve member for allowing the pressurized liquid lo force the valve member away from the stop member after the pressurized liquid flows through the aperture.

A securing means is further provided for securing the connector to the barrel. The barrel includes at least one lateral puncture and at least one ball engaged in the lateral puncture, the connector includes an annular groove for engaging with the ball, the hose coupling further includes a control ferrule slidably engaged ons aid barrel and having an annular flange for engaging with the at least one ball and for forcing the at least one ball to engage with the annular groove of the connector and for securing the connector to the barrel.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
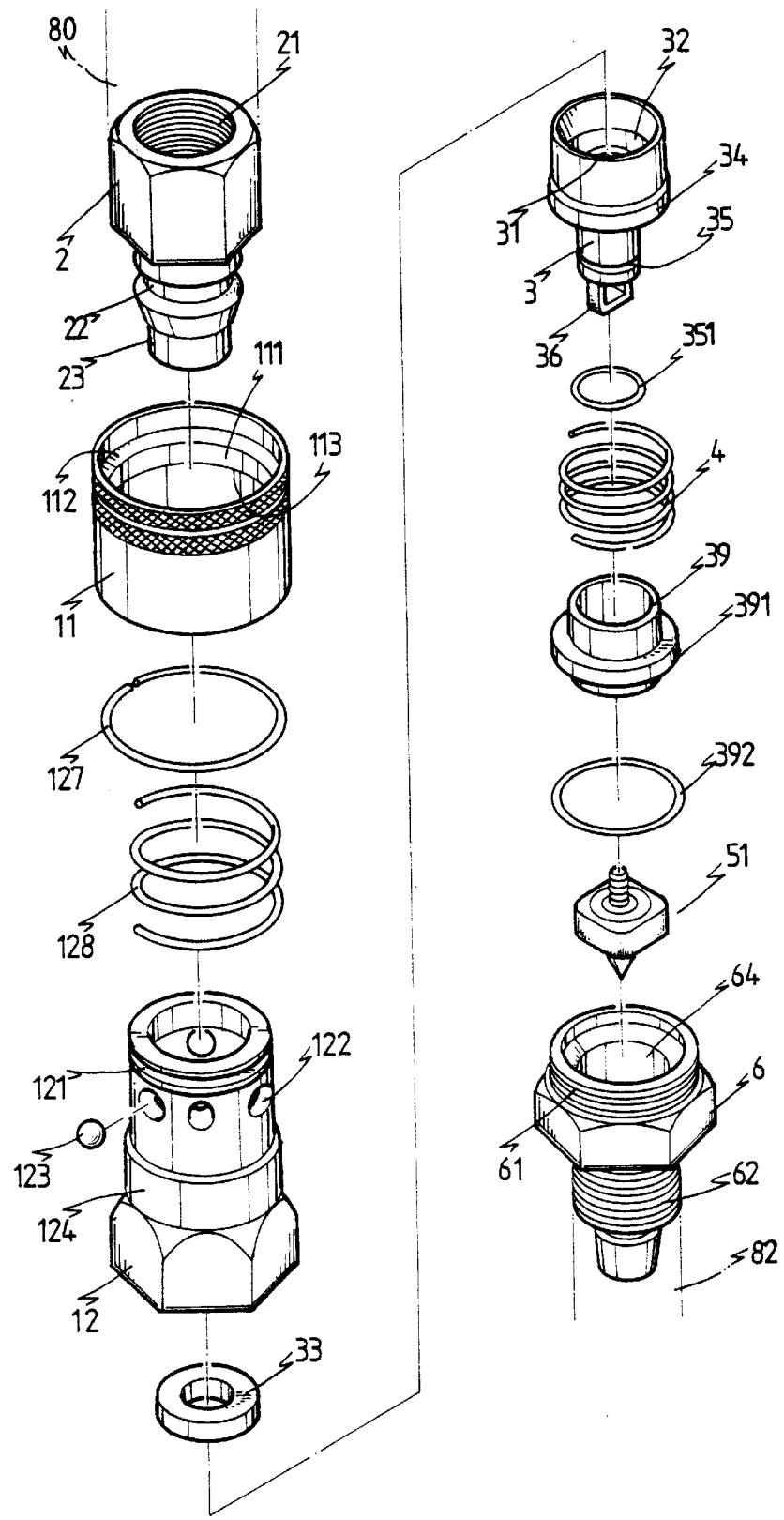
FIG. 1 is an exploded view of a hose coupling in accordance with the present invention.
Figure 2:
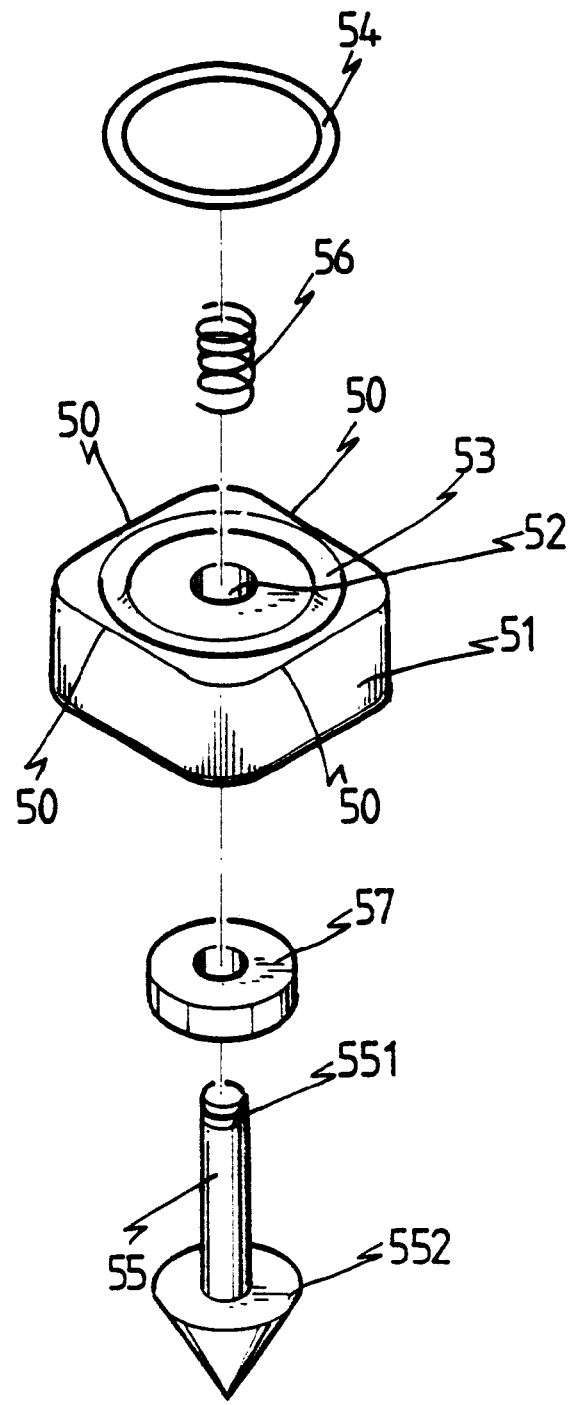
FIG. 2 is a partial exploded view of a valve device.
Figure 3:
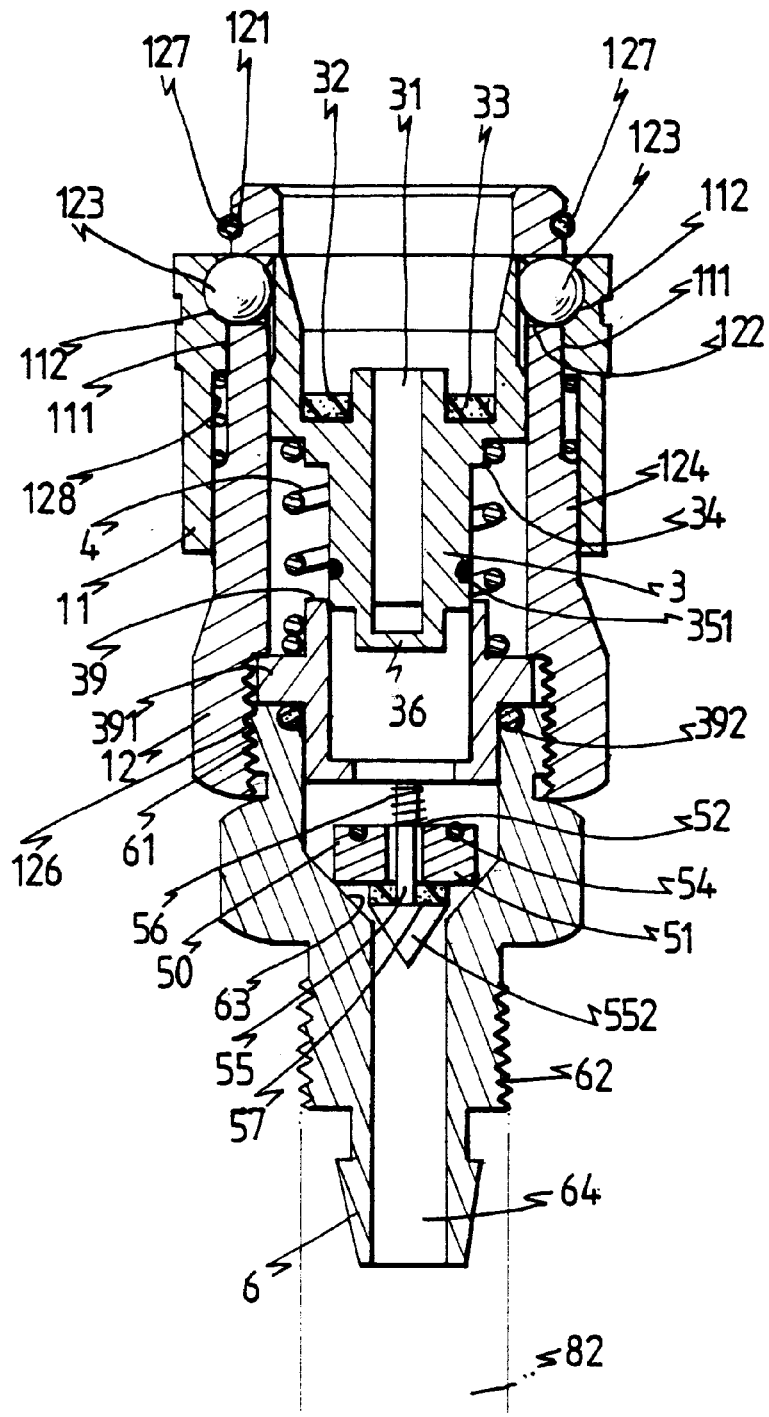
FIGS. 3, 4, 5, 6 are cross sectional views illustrating the operation of the hose coupling.

Referring to the drawings, and initially to FIGS. 1–3, a hose coupling in accordance with the present invention comprises a body 6 including an outer thread 62 formed on the lower portion for coupling to a hose 82 which is coupled to a high pressure source, such as a high pressure air or liquid source. The body 6 includes an outer thread 61 formed on the upper portion for engaging with an inner thread 126 of a barrel 12 (FIG. 3) and for securing the body 6 to the barrel 12. The body 6 includes a bore 64 and includes a valve seat 63 provided in the upper portion for engaging with a valve member 51. A stop member, such as a cylindrical member 39 includes an annular rib 391 secured between the body 6 and the barrel 12. A sealing ring 392 is engaged between the cylindrical member 39 and the body 6 for making a water or air tight seal therebetween.

Figure 7:
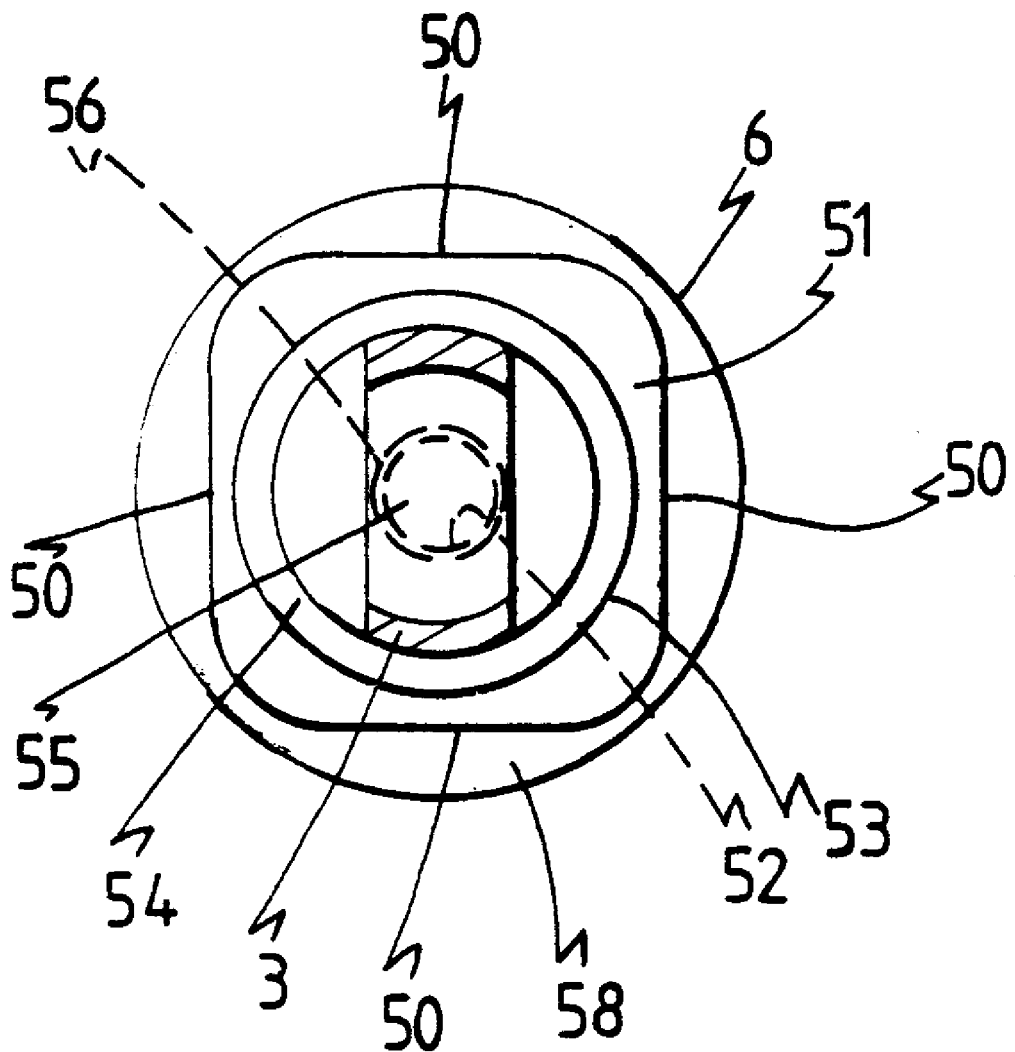
FIG. 7 is a schematic view illustrating the operation of the valve device.

As shown in FIGS. 2, 3, the valve member 51 is disposed in the body 6 and located between the valve seat 63 and the cylindrical member 39. The valve member 51 includes an annular recess 53 formed in top for engaging with a sealing ring 54 which may engage with the bottom portion of the cylindrical member 39 (FIGS. 4, 5) for making a water or air tight seal therebetween. The valve member 51 includes an aperture 52 for slidably engaging with a valve stem 55 which includes a head 552 for engaging with the valve member 51 and which includes an annular groove 551 formed in top for engaging with a clamping ring. A gasket 57 is engaged with the head 552 for engaging with the valve member 51 and for making a water or air tight between the valve member 51 and the head 552. A spring 56 may bias the head 552 and the gasket 57 to engage with the valve member 51. The valve member 51 includes one or more flat sides 50 (FIGS. 2, 7) for forming one or more passages 58 between the valve member 51 and the body 6 such that the pressurized air or water may flow through the valve member 51.

Figure 4:
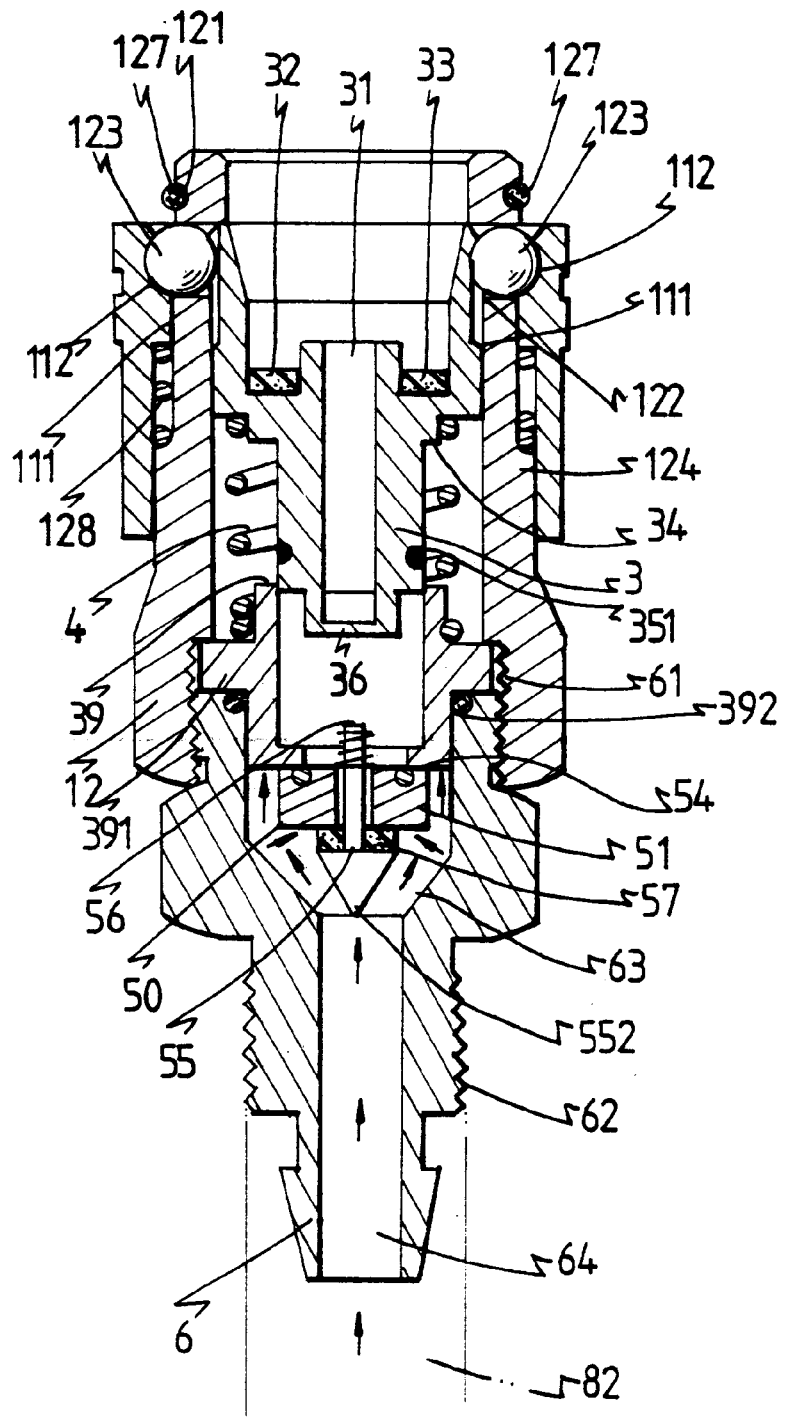

The barrel 12 includes an annular shoulder 124 formed on the lower and outer peripheral portion for engaging with a spring 128 and includes an annular groove 121 formed in the upper portion for engaging with a retaining ring 127 and includes one or more punctures 122 laterally formed in the upper portion for receiving one or more balls 123. A control ferrule 11 is rotatably and slidably engaged on the barrel 12 and includes an annular flange 111 extended radially inward. The annular flange 111 includes an annular shoulder 113 formed in the bottom for engaging with the spring 128 and includes an annular recess 112 formed in the upper portion for engaging with the balls 123 (FIGS. 3, 4). The spring 128 may bias the annular flange 111 to engage with the balls 123 for forcing the balls 123 inward of the barrel 12. The retaining ring 127 may engage with the control ferrule 11 (FIGS. 5, 6) for preventing the control ferrule 11 from being disengaged from the barrel 12.

An insert 3 is slidably engaged in the barrel 12 and includes an annular depression 32 for engaging with a gasket or a sealing ring 33. The insert 3 is slidably engaged into the cylindrical member 39 and includes an annular groove 35 for engaging with a sealing ring 351 which may make a water or air tight seal between the insert 3 and the cylindrical member 39. A spring 4 is engaged between the cylindrical member 39 and the annular rib 34 of the insert 3 for biasing the insert 3 away from the body 6. The insert 3 includes an orifice 31 for receiving the pressurized air or water from the hose 82 (FIGS. 5, 6) and includes a pusher 36 for engaging with the valve stem 55 and for disengaging the head 552 from the valve member 51 (FIG. 5) and for allowing the pressurized air or water to flow through the aperture 52 of the valve member 51 and to flow through the orifice 31 of the insert 3.

Figure 5:
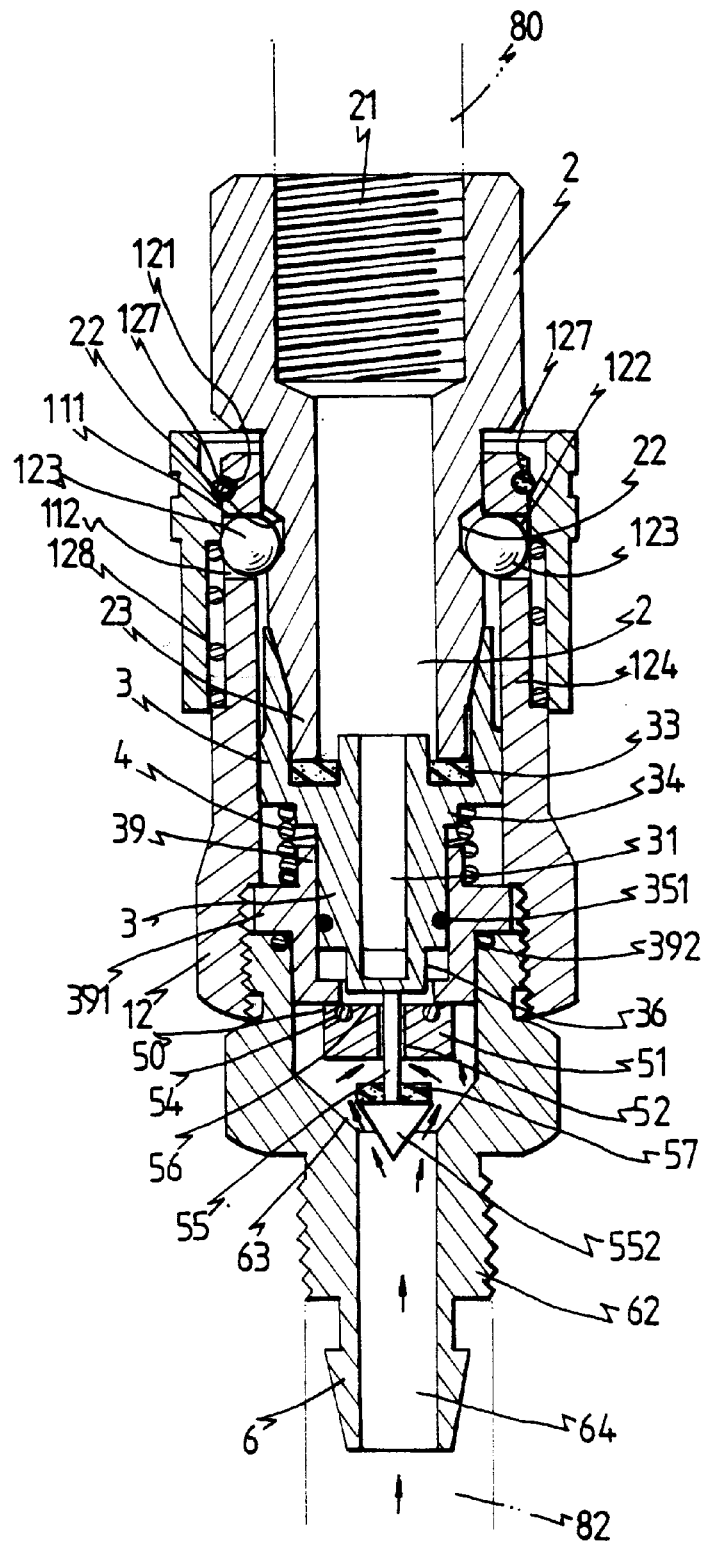
Figure 6:
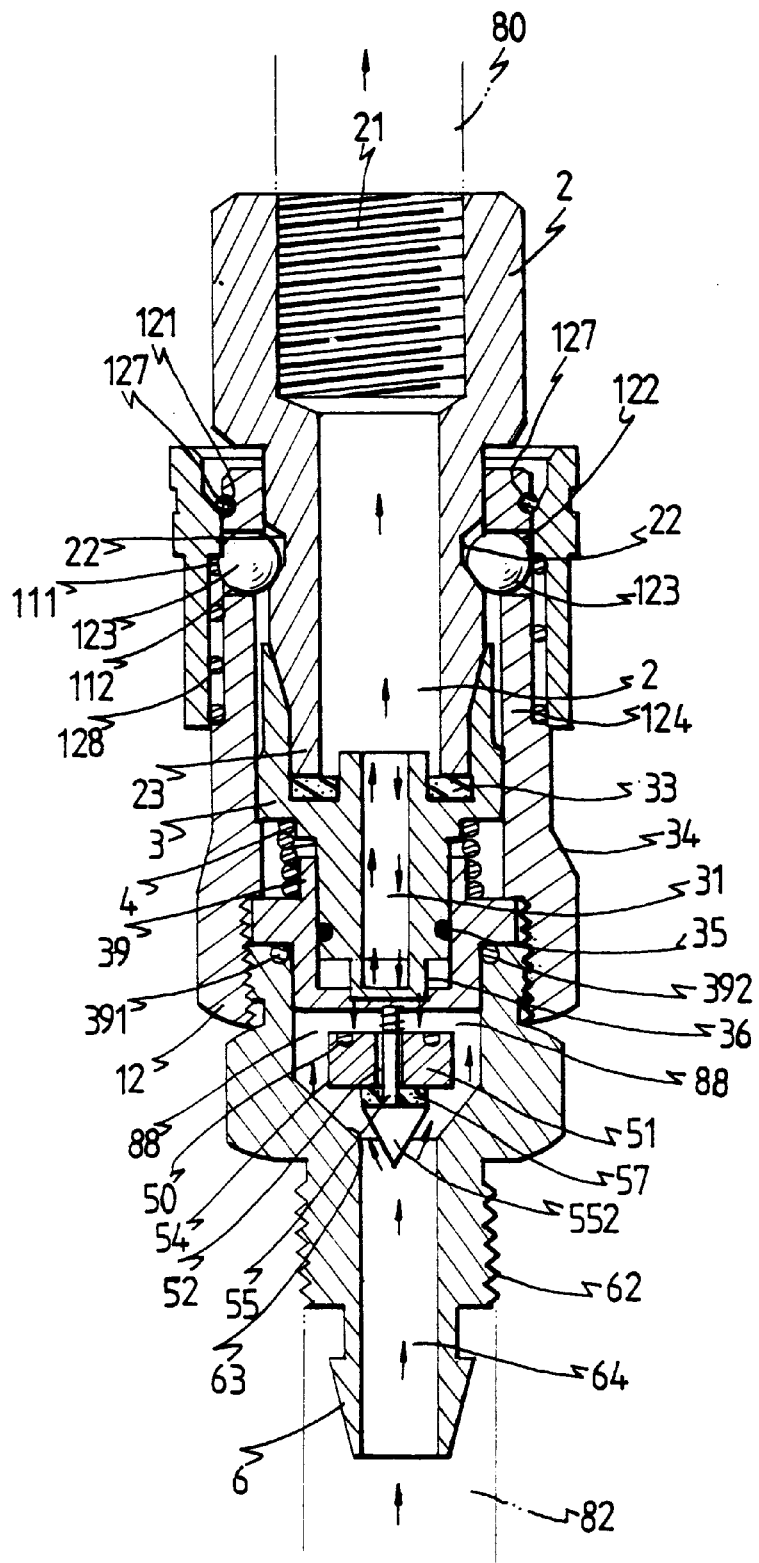

As shown in FIGS. 1, 5, 6, a connector 2 includes an inner thread 21 for securing to a pipe 80 which is coupled to a hydraulic or pneumatic facility and for receiving the pressurized air or water from the hose 82. The connector 2 includes a mouth 23 for engaging into the barrel 12 and for engaging with the insert 3 and for moving the insert 3 against the spring 4. The connector 2 includes an annular groove 22 for engaging with the balls 123. The spring 128 may bias the annular flange 111 of the control ferrule 11 to force the balls 123 to engage with the annular groove 22 for solidly securing the connector 2 to the barrel 12.

In operation, as shown in FIG. 4, when the hose 82 is coupled to a pressure source, the pressurized liquid may force the valve member 51 to engage with the cylindrical member 39 and may block the flowing passage of the pressurized liquid, such that the pressurized liquid may not flow out of the barrel 12. As shown in FIG. 5, when the connector 2 is engaged into the barrel 12 and when the pusher 36 is engaged with the valve stem 55 for disengaging the head 552 from the valve member 51, the pressurized liquid may flow through the aperture 52 of the valve member 51 and may flow through the orifice 31 of the insert 3 and may flow into the connector 2. However, at the beginning and at this moment, the pressurized liquid may flow through the aperture 52 only which includes a small size such that the pressurized liquid may not flow through the aperture 52 in a fast speed.

As shown in FIG. 6, when the pressurized liquid flows through and flows into the connector 2, the pressures on the lower portion and the upper portion of the valve member 51 is balanced such that the spring 56 may apply a force to force the head 552 toward the valve member 51 and such that the pressurized liquid may force the valve member 51 away from the cylindrical member 39, such that the pressurized liquid may quickly flow through the valve member 51 and may quickly flow into the connector 2.

Accordingly, the hose coupling in accordance with the present invention allows the connector to be easily and smoothly coupled to the barrel.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A hose coupling comprising:

a body including a first end for coupling to a pressurized liquid source and including a second end having a valve seat, a barrel secured to said second end of said body, a stop member secured between said barrel and said body, a valve member slidably engaged in said body and located between said valve seat of said body and said stop member, said valve member including an aperture and a valve stem slidably engaged in said aperture, said valve stem including a head for engaging with said valve member and means for biasing said head to engage with said valve member and for blocking said aperture, an insert slidably engaged in said barrel and including an orifice for receiving the pressurized liquid, said insert including a pusher for engaging with said valve stem and for disengaging said head from said valve member and for allowing the pressurized liquid to flow through said aperture of said valve member, means for biasing said insert away from said stop member, and a connector for engaging into said barrel and for forcing said insert against said insert biasing means and for actuating said pusher to disengage said head from said valve member and for allowing the pressurized liquid to flow through said aperture of said valve member, said head biasing means being allowed to force said head toward said valve member for allowing the pressurized liquid to force said valve member away from said stop member after the pressurized liquid flows through said aperture.

2. The hose coupling according to claim 1 further comprising means for securing said connector to said barrel.

3. The hose coupling according to claim 2, wherein said barrel includes at least one lateral puncture and at least one ball engaged in said at least one lateral puncture, said connector includes an annular groove for engaging with said at least one ball, said hose coupling further includes a control ferrule slidably engaged ons aid barrel and having an annular flange for engaging with said at least one ball and for forcing said at least one ball to engage with said annular groove of said connector and for securing said connector to said barrel.

* * * * *